United States Patent
Hardt et al.

(10) Patent No.: US 10,057,543 B2
(45) Date of Patent: Aug. 21, 2018

(54) DIGITAL VIDEO RECORDER HAVING LIVE-OFF-DISK BUFFER FOR RECEIVING MISSING PORTIONS OF BUFFERED EVENTS

(75) Inventors: Charles R. Hardt, Lawrenceville, GA (US); Navneeth N. Kannan, Doylestown, PA (US); Terry L. Ziegler, Lansdale, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 646 days.

(21) Appl. No.: 12/262,465

(22) Filed: Oct. 31, 2008

(65) Prior Publication Data

US 2010/0115574 A1    May 6, 2010

(51) Int. Cl.
| | |
|---|---|
| *H04N 7/16* | (2011.01) |
| *H04N 7/173* | (2011.01) |
| *H04N 21/2387* | (2011.01) |
| *H04N 21/41* | (2011.01) |
| *H04N 21/432* | (2011.01) |
| *H04N 21/433* | (2011.01) |
| *H04N 21/436* | (2011.01) |

(52) U.S. Cl.
CPC ......... *H04N 7/163* (2013.01); *H04N 7/17318* (2013.01); *H04N 21/2387* (2013.01); *H04N 21/4135* (2013.01); *H04N 21/4325* (2013.01); *H04N 21/4331* (2013.01); *H04N 21/43622* (2013.01)

(58) Field of Classification Search
CPC .......... H04N 21/4325; H04N 21/4331; H04N 21/2747; H04N 21/2387; H04N 21/4135; H04N 21/43622
USPC ..................... 725/88, 94, 139, 151
See application file for complete search history.

(56) References Cited

U.S. PATENT DOCUMENTS

| | | | | |
|---|---|---|---|---|
| 6,971,121 | B2 * | 11/2005 | West | H04N 5/76 348/731 |
| 7,457,520 | B2 * | 11/2008 | Rossetti | H04N 5/782 348/E7.073 |
| 7,870,585 | B2 * | 1/2011 | Ellis | H04N 5/44543 725/44 |
| 7,962,942 | B1 * | 6/2011 | Craner | 725/88 |
| 2003/0208763 | A1 * | 11/2003 | McElhatten | G06F 3/0482 725/58 |
| 2003/0208767 | A1 * | 11/2003 | Williamson | G06F 3/0482 725/93 |
| 2004/0078829 | A1 * | 4/2004 | Patel et al. | 725/135 |
| 2005/0120377 | A1 * | 6/2005 | Carlucci | G06F 3/0482 725/90 |
| 2005/0262534 | A1 | 11/2005 | Bontempi et al. | |

(Continued)

*Primary Examiner* — Alexander Q Huerta
(74) *Attorney, Agent, or Firm* — Stewart M. Wiener

(57) ABSTRACT

In accordance with one aspect of the invention, a method of receiving content over a content delivery system is provided. The method includes receiving a user request to initiate a rewind operation on content locally available in a live-off-disk (LOD) buffer. The content is associated with an event received over a content delivery system. If all of the event is not available in the LOD buffer, a message is communicated over the content delivery system to a headend requesting remaining content associated with an unreceived portion of the event. In response to the message, the remaining content is received from the headend over the content delivery system.

13 Claims, 5 Drawing Sheets

(56) References Cited

U.S. PATENT DOCUMENTS

| | | | |
|---|---|---|---|
| 2006/0080716 A1* | 4/2006 | Nishikawa | G06F 17/30849 725/89 |
| 2006/0140584 A1* | 6/2006 | Ellis | G11B 27/005 386/238 |
| 2007/0009235 A1* | 1/2007 | Walters et al. | 386/112 |
| 2008/0086743 A1* | 4/2008 | Cheng | H04N 5/76 725/38 |
| 2009/0282444 A1* | 11/2009 | Laksono | H04N 7/17336 725/89 |
| 2010/0138486 A1* | 6/2010 | Yang | H04L 65/4092 709/203 |
| 2010/0195974 A1* | 8/2010 | Zheng | H04N 5/76 386/343 |
| 2012/0213488 A1* | 8/2012 | Sato | H04N 5/913 386/230 |

* cited by examiner

DIGITAL VIDEO RECORDER HAVING LIVE-OFF-DISK BUFFER FOR RECEIVING MISSING PORTIONS OF BUFFERED EVENTS

FIELD OF THE INVENTION

The present invention relates generally to digital video recorder (DVR) devices, and more particularly to DVR devices that buffer live content using a "Live off Disk" (LOD) buffer.

BACKGROUND OF THE INVENTION

Digital video recorder (DVR) devices allow users to record various types of content, while offering several features that users may utilize in conjunction with the content. One feature provided by most DVR devices with respect to content allows the user to schedule certain content for daily recording, such as the daily news, weekly dramas, or movies. With this feature, the user may view the content recorded onto the DVR device at any time after recording.

In the context of conventional broadcasts, another feature provided by DVR devices, referred to as "Live off Disk" (LOD), allows users to pause live broadcast content, and rewind the content for a nominal amount of time on the current channel. LOD content may be subjected to such a rewinding event because LOD content is stored in a temporary buffer, which is used as temporary storage for the content while watching the "live" (i.e. buffered through the storage device) content. Thus, by storing this LOD content in the temporary buffer, this LOD feature allows the user to rewind anywhere within the temporary buffer up to the last channel change before arriving at the LOD content, or to the beginning of the temporary buffer, whichever is less.

One limitation of recording content live off disk arises when a user tunes to a channel in the middle of a program or other event. Since the LOD buffer only begins storing the program or event when the user tunes to it, the user will not be able to initiate a rewind operation to watch the program from the beginning.

Another similar situation in which this limitation of recording content live off disk arises will be illustrated with respect to FIG. 1. In this example the user is receiving a service 100 (e.g., a conventional broadcast, switched digital video content, etc.) over a content delivery system. The user is viewing event 1 on the service 100, which begins at 6 pm and is scheduled to end at 8 pm. However, event 1 runs late and does not in fact end until 8:15 pm. At 8:15 pm the user changes to service 101 and begins viewing event 3, which started at 8 pm and is scheduled to end at 8:30. The LOD buffer in the DVR device begins storing event 3 at 8:15 pm. Accordingly, the user is unable to rewind to an earlier point during the event because the LOD buffer does not contain data prior to 8:15 pm.

SUMMARY

In accordance with one aspect of the invention, a method of receiving content over a content delivery system is provided. The method includes receiving a user request to initiate a rewind operation on content locally available in a live-off-disk (LOD) buffer. The content is associated with an event received over a content delivery system. If all of the event is not available in the LOD buffer, a message is communicated over the content delivery system to a headend requesting remaining content associated with an unreceived portion of the event. In response to the message, the remaining content is received from the headend over the content delivery system.

In accordance with another aspect of the invention, a set top box is provided. The set top box includes a front-end for receiving content over a content delivery system and a DVR subsystem for selectively recording content received over the content delivery system. The DVR subsystem includes a storage medium for storing the recorded content and a live-off-disk (LOD) buffer. A processor, which is operatively associated with the front-end and the DVR subsystem, is configured to cause communication to be established with a headend over the content delivery system if only a portion of content associated with an event is available in the LOD buffer. The communication includes a request for receipt of at least some remaining content associated with the event.

DETAILED DESCRIPTION

Figure 2:
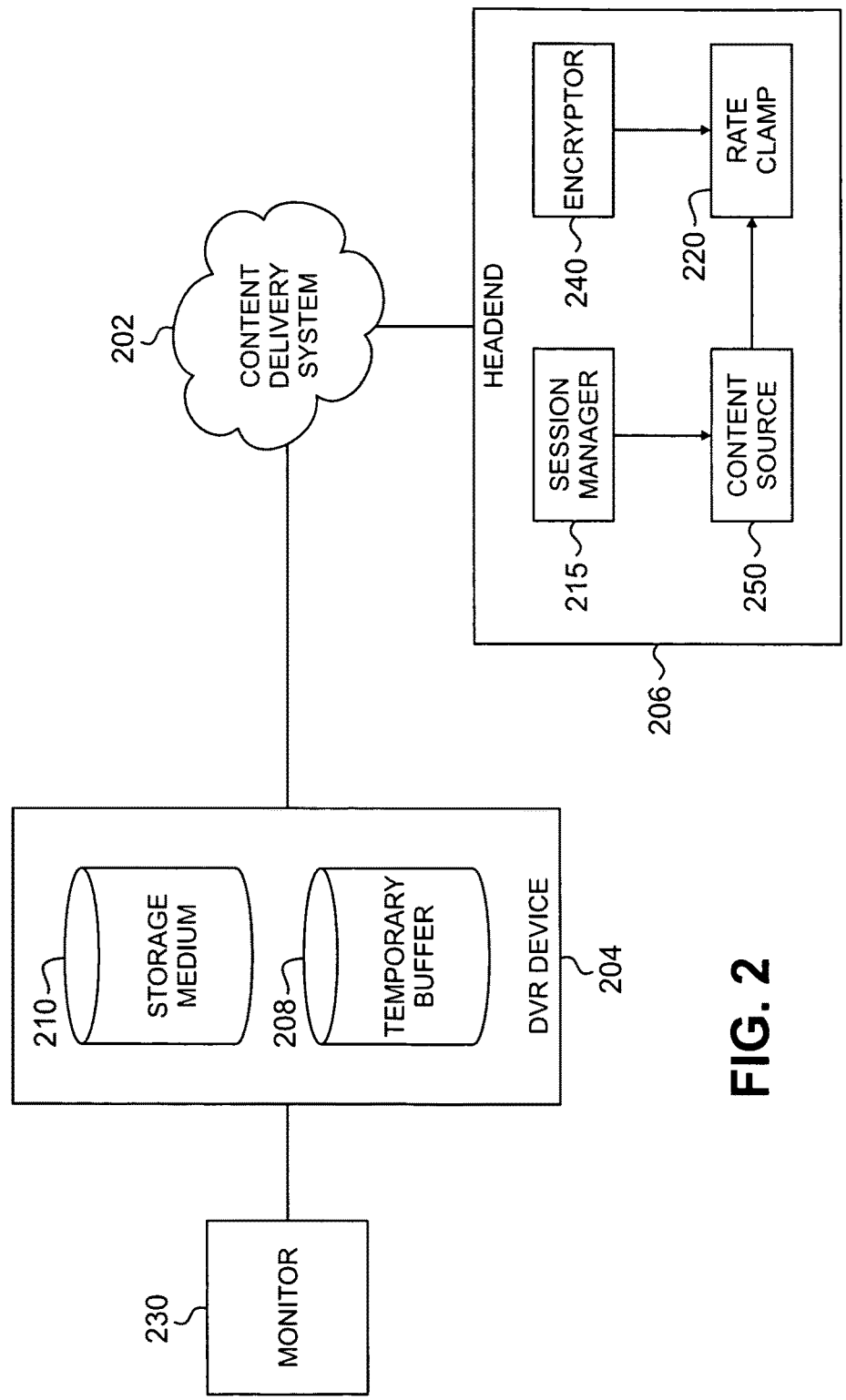
FIG. 2 shows one example of a system architecture that can be used to deliver content to a user for recording on a DVR device.

FIG. 2 is one example of a system architecture that can be used to deliver content to a user for recording on a DVR. The system includes a DVR device 204 that stores content received from a headend 206 over a content delivery system 202. A viewing monitor 230 is coupled to DVR device 204, and displays content received by DVR device 204 from content delivery system 202.

The DVR device 204 may be a set top box (STB) equipped with digital video recording capabilities. However, the DVR device 204 is not limited to this configuration. For example, the DVR device 204 may be embodied in a discrete apparatus such as a DVR player or a TV/DVR composite structure, or it may be distributed over a network with any combination of hardware, firmware, and software. The DVR device 204 includes a storage medium 210 for storing the content. The storage medium 210 may be one or more hard disk drives. Alternatively, the storage medium 210 may include other types of storage devices. For example, the storage medium 210 may include solid state memory devices such as chips, cards, or memory sticks. The storage medium 210 may also include magnetic tape, magnetic or optical disks, and the like. The temporary buffer 208, which may include volatile and/or non-volatile memory, stores "Live off Disk" (LOD) events as they are being received by the DVR device 204 over the content delivery system 202.

Illustrative examples of the content delivery system 202 include, but are not limited to, broadcast television networks, cable data networks, xDSL (e.g., ADSL, ADLS2, ADSL2+, VDSL, and VDSL2) systems, satellite television networks and packet-switched networks such as Ethernet networks, and Internet networks. In the case of a cable data network, an all-coaxial or a hybrid-fiber/coax (HFC) network may be employed. The all-coaxial or HFC network generally includes an edge QAM modulator and a hybrid fiber-coax (HFC) network, for example. The edge modulator receives Ethernet frames that encapsulate transport packets, de-capsulate these frames and removes network jitter, implements modulation and, performs frequency up-conversion and transmits radio frequency signals representative of the transport stream packets to end users over the HFC network. In the HFC network, the transport stream is distributed from the headend 206 (e.g., a central office) to a number of second level facilities (distribution hubs). Each hub in turn distributes carriers to a number of fiber nodes. In a typical arrangement, the distribution medium from the head-end down to the fiber node level is optical fibers. Subscriber homes are connected to fiber hubs via coaxial cables.

In the case of a packet-switched network, any suitable network-level protocol may be employed. While the IP protocol suite is often used, other standard and/or proprietary communication protocols are suitable substitutes. For example, X.25, ARP, RIP, UPnP or other protocols may be appropriate in particular installations.

The headend 206 includes a session manager 215. In some cases a session manager may be included for each digital service that is offered. For example, if the digital services being offered include switched digital video (SDV) and video on demand (VOD), the headend 206 may include a SDV session manager and a VOD session manager. Of course, as previously mentioned, other digital services may be offered as well, in which case corresponding session managers may be employed in the headend. The session managers set up their respective services, receive requests for such services from subscribers and, in the case of a cable data network, communicates with edge resource managers in the distribution hubs so that the services can be switched on and off under the control of the session manager. In particular, the session manager 215 is used to determine which transport streams are being transmitted at any time and for directing the DVR device 204 to the appropriate stream. The session manager 215 also keeps track of which subscribers are watching which channels. In addition, all subscriber requests for services go through the session manager 215. Under control of the session manager 215, content from a content source 250 (e.g., satellite receivers, off-air receivers, content storage devices) is forwarded to a rate clamp 220 and one or more encryptors 240 using, for example, IP multicast addressing. The content is then encrypted by the encryptor 240 and transmitted over the content delivery system 202. Typically, standard definition (SD) channels are currently rate clamped to 3.75 Mbps while high definition channels are currently rate clamped to between about 15 Mbps and 19 Mbps. The encryptor 240 encrypts the digitally encoded content, often under the control of a conditional access system (not shown).

As previously mentioned, one limitation that arises when recording content live off disk occurs when a user begins to receive a service in the middle of a program or other event. Since the LOD buffer 208 only begins storing the program or event when the user begins receiving it, the user will not be able to initiate a rewind operation to watch or otherwise render the program from the beginning. To overcome this problem, when the user rewinds through an LOD event that has not been buffered from its beginning, the DVR device 204 establishes communication with the session manager 215 in the headend 206 and sends a message requesting the session manager 215 to begin spooling the missing portion of the event. The session manager 215, in turn, will cause the requested content to be spooled to the DVR device 204 from the content source 250. Since the user is rewinding through the event, the content will be spooled in the reverse chronological order. Once the user has rewound through the event to the point at which they want to begin viewing it, the user will initiate a "play" operation. The play operation will be communicated to the session manager 215, which in response will cause the content to be spooled from the headend in normal frame order. The content will continue to be delivered to the DVR device 204 by the headend 206 until the point is reached at which the event is available on the LOD buffer 208. At this time the spooling process is terminated and the remainder of the event is rendered from the LOD buffer 208.

Figure 1:
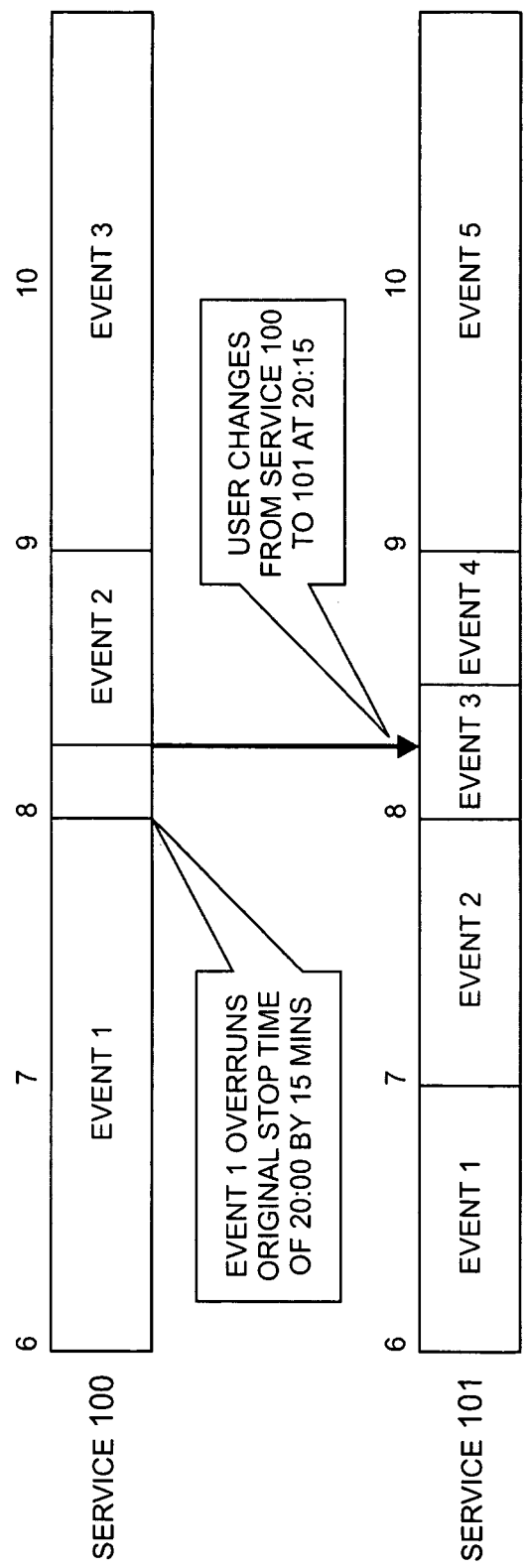
FIG. 1 shows a time sequence over which a first event or service is being received after which a viewer tunes to a second event or service already in progress.

As a concrete example, in the previously mentioned example discussed in connection with FIG. 1, the LOD buffer stores the second portion of event 3 that was received between 8:15 pm and 8:30 pm but does not store the first portion of event 3 that occurred between 8:00 pm and 8:15 pm. Accordingly, as the user rewinds through the event, the first portion of event 3 will be spooled to DVR device 204 from the headend for presentation to the user while the second portion of event 3 will be presented to the user directly from the LOD buffer 208. While rewinding through the first portion of the program, the content will be spooled in reverse chronological order, whereas when normal play is initiated it will be spooled in its normal frame order.

The manner in which messages are communicated from the DVR device 204 to the headend 206 will depend on the type of content delivery system 202 that is employed. For instance, in the case of a cable data network, such messages and other control information may be communicated using out-of-band (OOB) or DOCSIS channels or an IP tunnel or an IP connection and associated protocols. However, in some cases communication of control information and the like can be performed using in-band channels as well.

Figure 3:
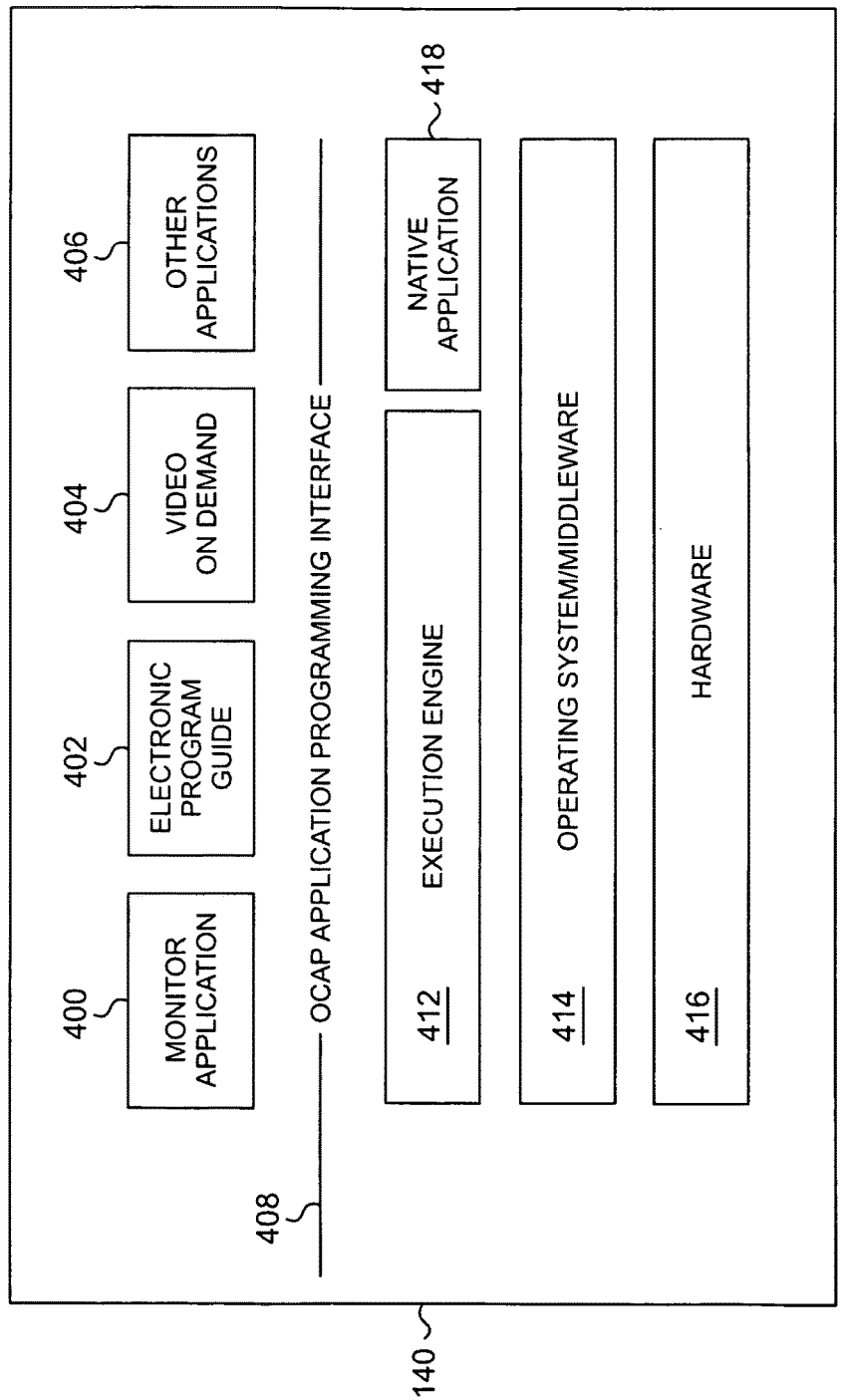
FIG. 3 shows the logical architecture of one particular example of the DVR device.

FIG. 3 shows the logical architecture of one particular example of the DVR device 204 shown in FIG. 2. In this example the DVR device is illustrated as a set-top box 140 that is compliant with the OpenCable Application Platform (OCAP) hardware and software environment. The OCAP specification is a middleware software layer specification intended to enable the developers of interactive television services and applications to design such products so that they will run successfully on any cable television system, independent of set-top or television receiver hardware or operating system software choices. As is well known, middleware generally comprises one or more layers of software which are positioned "between" application programs and the lower or physical layers of the network device. Middleware is commonly written for the specific requirements of the operator of the computer system, and the proprietary software purchased by the operator of the computer system. A key role of middleware is to insulate the application programs from the device specific details. By using middleware the application programmers need know very little about the actual network details, since they can rely on the middleware to address the complexities of interfacing with the network. Of course, the set-top box 140 is not limited to an OCAP-compliant software/hardware architecture. In other cases, for example, the set-top box 140 may be compliant with MHEG, DASE or Multimedia Home Platform (MHP) middleware. Alternatively, the set top box 140 may be based on a proprietary architecture.

Referring to FIG. 3, the top of an OCAP software "stack" includes a Monitor Application 400, Electronic Program Guide (EPG) 402, Video-on-Demand Application 404, and any other applications 406. These applications are run on top of a software layer called the "Execution Engine" 412 and interface to the Execution Engine using the well known OCAP APIs 408. The set-top box may also include certain software applications or "Native Applications" 418 that do not run within the Execution Engine, but run directly on top of the Operating System/Middleware 414 for the set-top box. Native Applications are typically written for, e.g., a particular hardware configuration 416 of the set top box 140. Examples of such Native Applications may include management of front panel functionality, remote control interaction, games, and the like.

Figure 4:
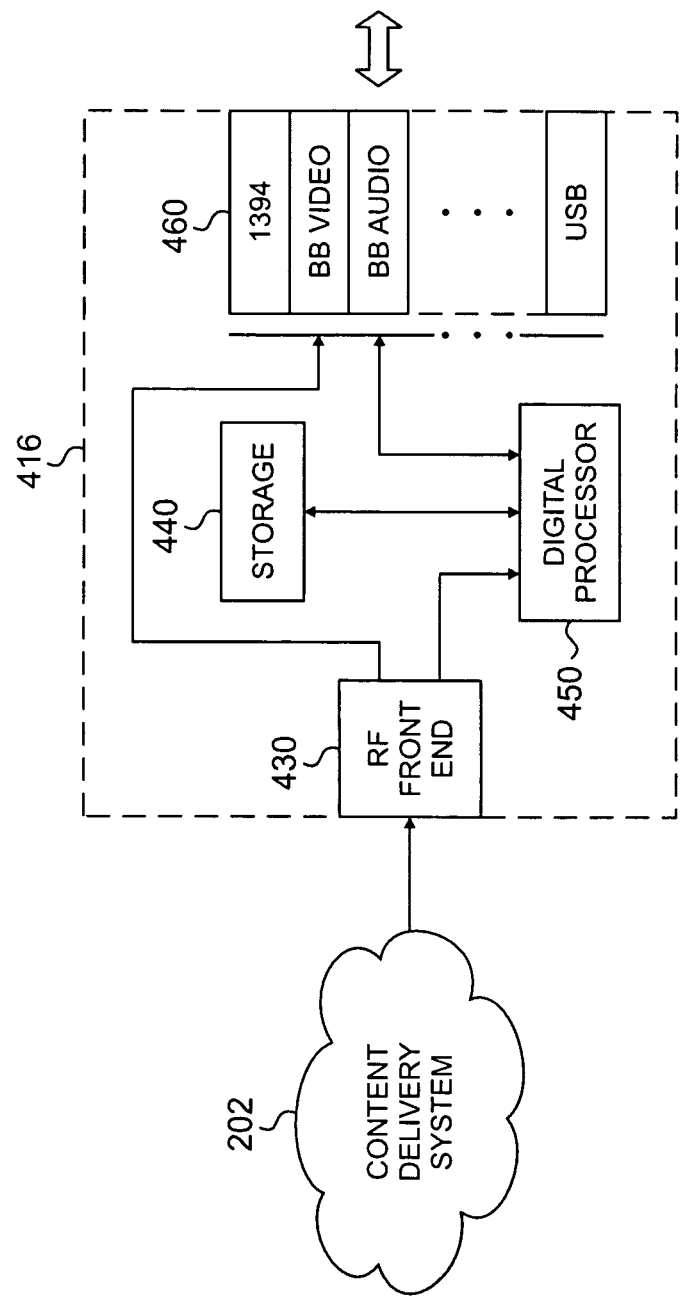
FIG. 4 shows one example of the hardware that may be employed to implement a set top box that includes a DVR.

FIG. 4 shows one example of the set top box hardware 416. The hardware 416 generally includes a front end 430 (e.g., a network interface such as an Ethernet interface) for interfacing with the content delivery system 202 of FIG. 2, digital processor(s) 450, storage device 440, and a plurality of interfaces 460 (e.g., video/audio interfaces, IEEE-1394 "Firewire", USB, serial/parallel ports, etc.) for establishing communication with other end-user devices such as televisions, personal electronics, computers, WiFi or other network hubs/routers, etc. Other components which may be utilized within the set-top box include RF tuner and decoder stages, various processing layers (e.g., DOCSIS MAC, OOB channels, MPEG, etc.) as well as media processors and other specialized SoC or ASIC devices. These additional components and functionality are well known to those of ordinary skill in the art and accordingly are not described further herein.

Figure 5:
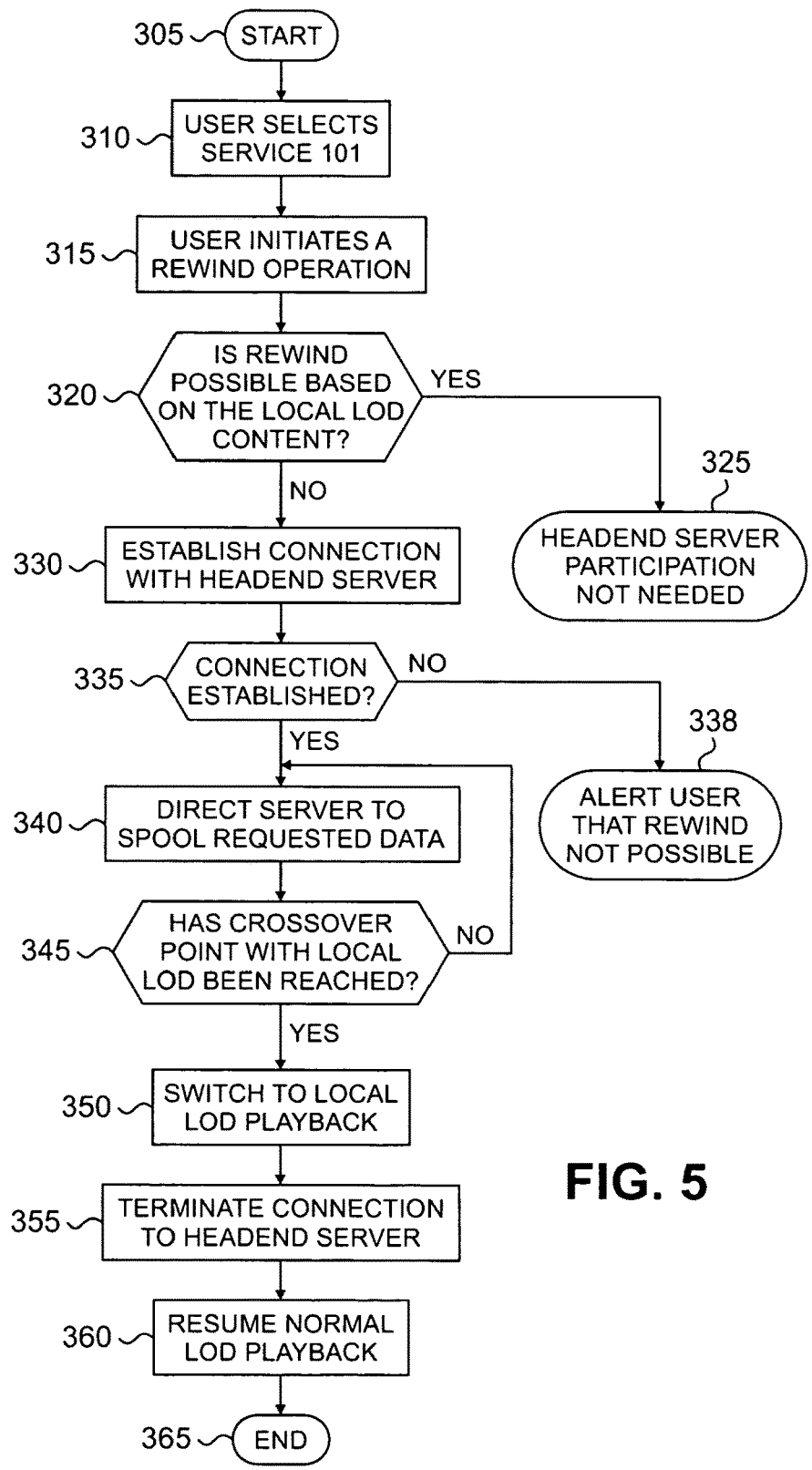
FIG. 5 is a flowchart illustrating one example of a method by which a DVR device presents a "Live off Disk" (LOD) event, which may have only in part been stored in the device's LOD buffer.

FIG. 5 is a flowchart illustrating one example of a method by which a DVR device presents to a user an LOD event, which may have only in part been stored in the device's LOD buffer. The method begins in step 305 and moves to step 310 when a user selects a particular service for delivery. In this example the user begins receiving the service at some time after an event (e.g., a program) has already begun. Accordingly, after the user briefly watches the event and determines that he or she wishes to view it from the beginning (or from some other time preceding the time at which the event began to be received), in step 315 the user initiates a rewind operation. Next, the DVR device determines in step 320 whether the LOD buffer has captured the entire event or only a part of it. This determination may be accomplished in a number of different ways. For example, if the DVR device is incorporated in a set top box, it may consult the electronic program guide typically included with such boxes to determine the start time and end time of the event and compare these times to start and end times of the event captured in the LOD buffer. The start and end times of the event captured in the LOD buffer is readily available from the Presentation Time Stamp (PTS) that is included with the transport stream that delivers the service.

If at decision step 320 the DVR device determines that the entire event has been stored in the LOD buffer, the method proceeds to step 325 where the DVR device determines that it does not need the participation of the headend. In this case the user may play and rewind the event exclusively from the LOD buffer. On the other hand, if the DVR device determines that it will need the participation of the headend, the DVR device establishes communication with the headend over the content delivery system by, e.g, sending a message to the appropriate session manager in step 330. If at decision step 335 the DVR device determines that it cannot access the headend to receive the requested content, the user is alerted at step 338 that further rewinding through the event is not possible. On the other hand, if communication is established with the headend, the DVR device requests the headend to spool the requested content to the DVR device in step 340. The requested content may be presented to the user as it is being spooled from the headend. Alternatively, or in addition, if the content is to be stored on the local storage medium of the DVR device, its index file will need to be updated, which would treat the requested content as a new event.

The content received from the headend may be rendered by the user using trick play modes of operation or in a normal playback mode. In any case, the DVR device determines in step 345 if during the rendering process the crossover point has been reached defining the transition between the portion of the event stored in the LOD buffer and the portion being received from the headend. If it has not yet been reached, then the method returns to step 340 where the DVR device will continue to direct the headend to spool the requested content, as needed. Once the crossover point to the portion of the event being stored in the LOD buffer is reached during the rendering process, the DVR device switches content sources in step 350 so that the event is being rendered from the LOD buffer instead of from the headend. Since no further content is needed from the headend, the connection between the DVR device and the headend is terminated in step 355 and playback of the event from the LOD buffer continues in the normal manner in step 360 until the process terminates at step 365.

It should be noted that in the example of FIG. 5 the DVR device may contact the headend before the content is actually needed from the headend. That is, the DVR device may contact the headend while only the portion of an event stored in the LOD buffer is being rendered. By initiating communication with the headend in advance of when the content is needed, the transition that arises when the headend is used as the content source instead of the LOD buffer may be made transparent to the user. However, in some implementations communication between the DVR device and the headend may only be established when the transition point is reached. However, this is likely to cause the user to experience a brief delay while the DVR device switches from using the LOD buffer as the content source to the headend.

The processes described above, including those shown in FIG. 5, may be implemented in a general, multi-purpose or single purpose processor. Such a processor will execute instructions, either at the assembly, compiled or machine-level, to perform that process. Those instructions can be written by one of ordinary skill in the art following the description of FIG. 5 and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

Although various embodiments and examples are specifically illustrated and described herein, it will be appreciated that modifications and variations are covered by the above teachings and are within the purview of the appended claims.

The invention claimed is:

1. A method of receiving content over a content delivery system, the method comprising:
   receiving a request to initiate a rewind operation on content associated with an event, wherein the content is received over a content delivery system;

determining that at least a portion of the content associated with the event is not available in a local storage, wherein a live-off-disk (LOD) buffer is configured to buffer content previously received over the content delivery system for rendering during rewind operations;

communicating a message over the content delivery system to a headend, the message specifying a delivery in reverse of normal chronological frame order, and the message comprising a request for the delivery of the portion of the content associated with the event that is locally unavailable;

by a digital video recorder (DVR) device, in response to the message, receiving from the headend the delivery as a stream, in reverse of normal chronological frame order of the requested content, wherein the headend spools the requested content for the delivery;

rendering by the DVR device, without locally storing a file of the requested content received as the stream, and without updating an index file of the requested content, the stream of the delivery of the requested content contemporaneously as it is spooled by the headend, in reverse of normal chronological frame order as received during the rewind operation;

communicating a message over the content delivery system to the headend to deliver the requested content in normal chronological frame order; and rendering the requested content received from the headend in normal chronological frame order;

wherein upon reaching a point in the rendering of the content at which the content is available from the LOD buffer, the source of the content for rendering is switchable from the headend to the LOD buffer such that rendering subsequent content, in normal chronological frame order, is from the LOD buffer.

2. The method of claim 1 wherein communicating the message is performed prior to reaching a point in the rendering of the content at which no more of the content is available from the LOD buffer.

3. The method of claim 1 wherein communicating the message is performed when a point in the rendering of the content is reached at which no more of the content is available from the LOD buffer.

4. The method of claim 1 wherein determining that the request includes a request for content that is not available in a local storage comprises determining that all of the event is not available in the LOD buffer.

5. The method of claim 4 further comprising determining that all of the event is not available in the LOD buffer by consulting an electronic program guide to identify a start and end time for the event.

6. A set top box, comprising:
a front-end for receiving content over a content delivery system;
a digital video recorder (DVR) subsystem for selectively recording content received over the content delivery system, said DVR subsystem including a storage medium for storing the recorded content and a live-off-disk (LOD) buffer; and
a processor operatively associated with the front-end and the DVR subsystem and being configured to cause communication to be established with a headend over the content delivery system if it is determined that at least a portion of the content associated with the event is not available in the storage medium, wherein the LOD buffer is configured to buffer content previously received for rendering during rewind operations,
wherein the communication includes a message specifying a delivery in reverse of normal chronological frame order, the message comprising a request for the delivery of the portion of the content associated with the event that is locally unavailable,
wherein the headend spools the requested content for the delivery;
wherein the front-end is configured for receiving from the headend the delivery as a stream in reverse of normal chronological frame order of the requested content when the communication includes a request for a rewind operation, and the front-end is configured for receiving the requested content in normal chronological frame order from the headend when the communication includes a request for delivery to be in normal chronological frame order,
wherein the DVR subsystem is configured to render, without locally storing a file of the requested content received as the stream, and without updating an index file of the requested content, the stream of the requested content contemporaneously as it is spooled from the headend, in the frame order received from the headend; and
wherein upon reaching a point in the rendering of the content at which a second portion of the content is available from the LOD buffer, the source of the content for rendering is switchable from the headend to the LOD buffer such that rendering subsequent content, in normal chronological frame order, is from the LOD buffer.

7. The set-top box of claim 6 wherein the processor is further configured to cause the communication to be established upon the user request.

8. The set-top box of claim 6 wherein the processor is further configured to cause the communication to be established when the user-initiated rewind operation reaches a point in the rendering of the content at which no more content associated with the event is available in the LOD buffer.

9. The set top box of claim 6 further comprising an electronic program guide and wherein the processor is further configured to determine that all of the event is not available in the LOD buffer by consulting the electronic program guide to identify a start and end time for the event.

10. At least one non-transitory computer-readable medium encoded with stored instructions which, when executed by a processor, cause the processor to perform steps comprising:
causing content associated with a subsequent portion of an event received from a headend over a content delivery system to be buffered in a live-off-disk (LOD) buffer of a digital video recorder (DVR) device upon receipt, wherein the LOD buffer is configured to buffer content previously received over the content delivery system for rendering during rewind operations;
in response to a request to initiate a rewind operation on the content available in the LOD buffer, rendering the content from the LOD buffer in reverse of normal chronological frame order;
after causing the content to begin being rendered, determining that at least a portion of the content associated with the event is not available in the LOD buffer;
communicating a message, the message specifying a delivery in reverse of normal chronological frame order, and the message comprising a request for the delivery over the content delivery system of additional content associated with at least the portion of the content associated with the event that is not available in the LOD buffer, wherein the portion is an initial portion of the event preceding the subsequent portion of the event; and upon reaching a point in the rendering of the content during the rewind operation at which no more of the content is available from the LOD buffer, switching the source of the content for rendering from the LOD buffer to the headend, receiving the delivery as a stream in the DVR device and rendering, without locally storing a file of the requested content received as the stream, and without updating an index file of the requested content, the stream of the additional content of the delivery received in reverse of normal chronological frame order contemporaneously as it is spooled by the headend, the rendering being performed in reverse of normal chronological frame order as received during the rewind operation; and in response to a second user request, rendering at least a second portion of the additional content received from the content delivery system in normal chronological frame order;

wherein upon reaching a point in the rendering of the content at which the content is available from the LOD buffer, the source of the content for rendering is switchable from the headend to the LOD buffer such that rendering subsequent content associated with the subsequent portion of the event, in normal chronological frame order, is from the LOD buffer.

11. The computer-readable medium of claim 10 wherein requesting receipt of the additional content is performed prior to reaching the point in the rendering of the content during the rewind operation at which no more of the content is available from the LOD buffer.

12. The computer-readable medium of claim 10, the steps further comprising determining that all of the event is not available in the LOD buffer.

13. The computer-readable medium of claim 10, the steps further comprising determining that all of the event is not available in the LOD buffer by consulting an electronic program guide to identify a start and end time for the event.

* * * * *